UNITED STATES PATENT OFFICE.

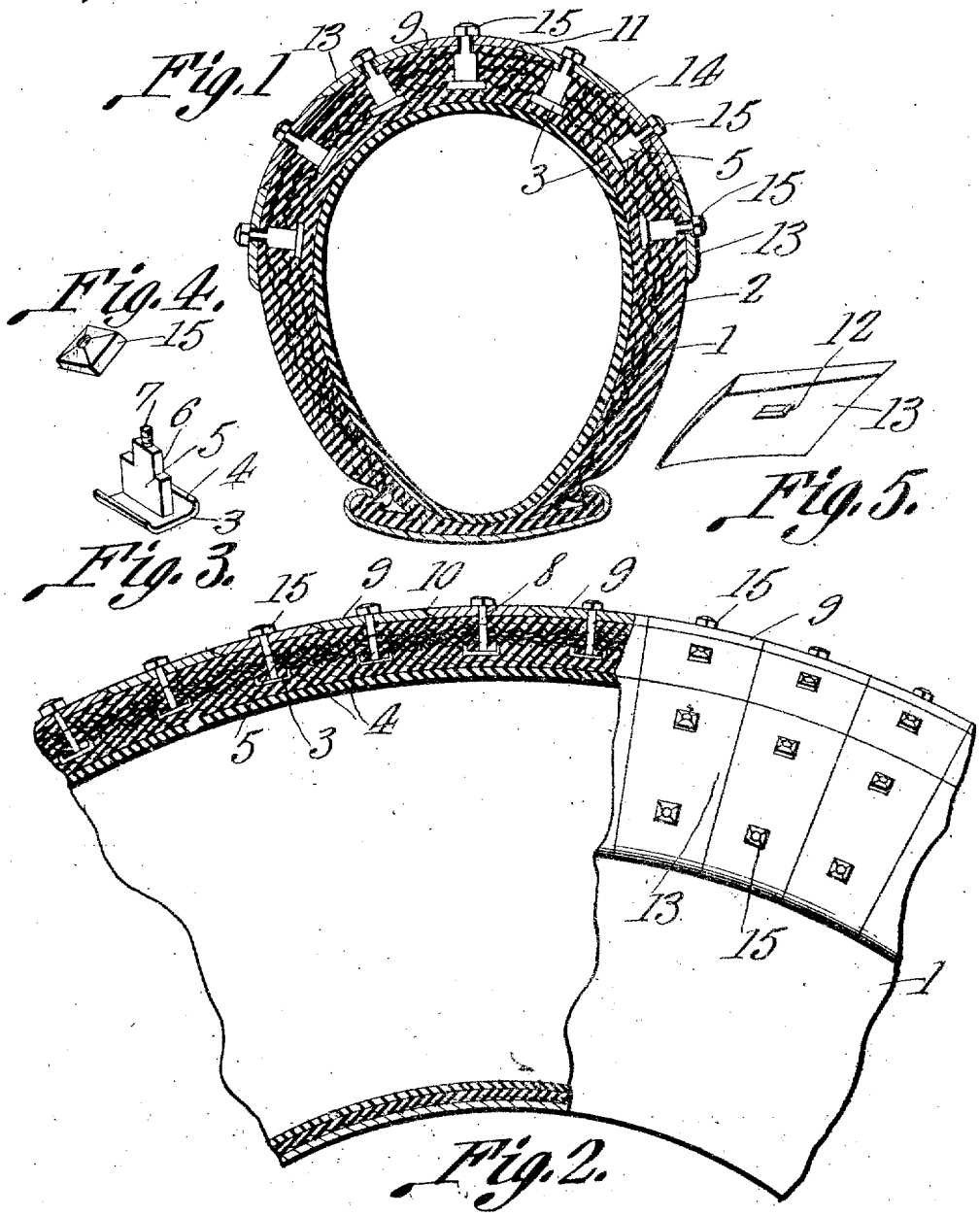

JOSEPH A. VITELLO, OF ABBEVILLE, LOUISIANA.

TIRE.

977,492.  Specification of Letters Patent.  Patented Dec. 6, 1910.

Application filed July 12, 1910. Serial No. 571,839.

*To all whom it may concern:*

Be it known that I, JOSEPH A. VITELLO, a citizen of the United States, residing at Abbeville, in the parish of Vermilion and State of Louisiana, have invented a new and useful Tire, of which the following is a specification.

This invention relates to tires for automobiles and the like, its object being to provide a pneumatic tire having armor secured thereto in a novel manner, the means employed for attaching the plates of the armor being an integral part of the tire so as to properly hold the plate to the tire.

A further object is to provide armor, the plates of which are mounted and arranged in a novel manner so as to fully protect all parts of the tread portion of the tire.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a transverse section through a tire constructed in accordance with the present invention. Fig. 2 is a longitudinal section through a portion of the tire, a part of said tire being shown in side elevation. Fig. 3 is a perspective view of one of the anchoring devices used in connection with the armor. Fig. 4 is a detail view of the nut used upon the anchoring device. Fig. 5 is a perspective view of one of the armor plates.

Referring to the figures by characters of reference 1 designates the outer tube of a pneumatic tire, this tube being provided with spaced layers of canvas 2 or the like, such as commonly employed. Arranged within the tread portion of the tire are anchoring devices each of which is similar to the one shown in detail in Fig. 3. Each anchoring device consists of a head 3 having flanges 4 along opposite sides thereof, there being a flat shank 5 extending from the center portion of the head and provided with an angular extension 6 at its free end and from which projects a screw threaded stud 7. The shank 5 extends from the tread of the tire and inwardly through one or more thicknesses of fabric formed within the outer tube of the tire, the head 3 being arranged back of the fabric portion of the structure so as to be firmly held in place, the said fabric serving to prevent the anchoring device from being pulled out of the tire structure.

The angular portion 6 of each anchoring device projects beyond the outer face of the tire tube 1 and these projecting portions arranged along the longitudinal center of the tread portion of the tire project into rectangular openings 8 formed in the centers of the armor plates 9 constituting the middle series, each of these plates 9 having its ends beveled and parallel, as clearly shown at 10 in Fig. 2, while its sides are beveled and converge inwardly, as shown at 11 in Fig. 1. The angular projecting portions of the remaining anchoring devices project into angular openings 12 formed within armor plates 13 arranged in annular series at each side of the central series of plates 9. These side plates are curved so as to conform with the contour of the tire tube and the side edges thereof are beveled and disposed in parallel planes as shown at 14 and the ends thereof are correspondingly beveled. It will thus be seen that when all of the plates constituting the armor are assembled upon the anchoring devices, a flexible shield made up of separate plates, is produced, all of these plates being movably engaged by the adjoining plates so that the resiliency of the tire is not impaired by the plates. As the adjoining edge portions of the plates lap, there is no danger of any pointed objects or the like forcing their way through the armor and into the outer tire 2. Each of the plates 9 and 13 may be attached to its anchoring device by means of a nut such as shown, for example, at 15, each nut being preferably substantially pyramidal and being in engagement with the threaded portion 7 of the anchoring device. These nuts serve not only to hold the plates upon the anchoring devices but also prevent skidding.

Various changes may be made in the construction and arrangement of the parts without departing from the spirit or sacrificing any of the advantages of the invention as defined in the appended claims.

What is claimed is:—

1. The combination with a tire, of anchoring devices embedded within and having angular portions projecting beyond the tire, armor plates having angular openings for the reception of said angular projecting portions, and means engaging the anchoring devices for holding the plates upon said anchoring devices, said means constituting anti-skidding devices.

2. A tire including arcuate armor plates having lapping edge portions, anchoring devices embedded at their inner ends within the tire and having angular projecting portions engaged by the plates, and anti-skidding devices engaging the projecting portions to hold the plates thereon.

3. The combination with a tire, of anchoring devices embedded therein and having angular portions projecting beyond the tire, armor plates engaging and held against rotation by said angular projecting portions, and means for securing the plates to said portions.

4. The combination with a tire, of anchoring devices embedded at one end within the tire and having angular portions projecting beyond said tire, armor plates arranged in annular series, each plate having beveled edges lapped by adjoining plates, and means for securing each plate upon the angular projecting portion of an anchoring device.

5. The combination with a tire including a fabric structure embedded therein, of anchoring devices extending through said structure and embedded at one end within the tire, each of said devices including a shank, a head lapped and retained by the fabric, and an angular portion projecting beyond the tire, and armor plates detachably secured to said projecting portions.

6. The combination with a tire, of anchoring devices embedded at one end within the tire, each of said devices including a flanged head, a shank extending therefrom, an angular projection on the shank and extending beyond the outer face of the tire, and a threaded stud upon the extension, and armor plates engaging the extensions, and means engaging the studs for holding the plates upon the extensions.

7. The combination with a tire, of anchoring devices embedded at their inner ends within the tire, each of said devices including a flanged head, a shank, an angular portion projecting from the shank and beyond the outer face of the tire, and a threaded stud, armor plates detachably engaging the projecting portions of the anchoring devices, and having lapping edge portions, and means engaging the studs for holding the plates upon the anchoring devices.

In testimony that I claim the foregoing as my own, I have hereto affixed my signature in the presence of two witnesses.

JOSEPH A. VITELLO.

Witnesses:
MAURICE J. MEQUIER,
GILBERT J. LABAUVE, Jr.